United States Patent
Pang et al.

(10) Patent No.: US 11,149,496 B2
(45) Date of Patent: Oct. 19, 2021

(54) COUPLING APPARATUS FOR COILED TUBINGS OF DIFFERENT DIAMETERS, INSTALLING METHOD FOR COUPLING APPARATUS, AND INSTALLING METHOD FOR TUBINGS OF DIFFERENT DIAMETERS USING COUPLING APPARATUS

(71) Applicants: CHINA NATIONAL PETROLEUM CORPORATION, Beijing (CN); XINJIANG PETROLEUM ADMINISTRATION ENGINEERING TECHNOLOGY COMPANY, Kelamayi (CN)

(72) Inventors: Dexin Pang, Beijing (CN); Abulimiti Aibaibu, Beijing (CN); Xinwei Guo, Beijing (CN); Qian Zhao, Beijing (CN); Jianlei Wang, Beijing (CN); Wenxin Yang, Beijing (CN); Yajing Wang, Beijing (CN)

(73) Assignees: CHINA NATIONAL PETROLEUM CORPORATION, Beijing (CN); XINJIANG PETROLEUM ADMINISTRATION ENGINEERING TECHNOLOGY COMPANY, Kelamayi (CN)

(*) Notice: Subject to any disclaimer, the term of this patent is extended or adjusted under 35 U.S.C. 154(b) by 383 days.

(21) Appl. No.: 15/879,295

(22) Filed: Jan. 24, 2018

(65) Prior Publication Data
US 2018/0209572 A1    Jul. 26, 2018

(30) Foreign Application Priority Data
Jan. 24, 2017  (CN) .......................... 2017 1 0055271

(51) Int. Cl.
*E21B 1/00* (2006.01)
*E21B 17/04* (2006.01)
(Continued)

(52) U.S. Cl.
CPC ................ *E21B 1/00* (2013.01); *E21B 17/04* (2013.01); *E21B 17/20* (2013.01); *F16L 19/0206* (2013.01)

(58) Field of Classification Search
CPC ... F16L 19/0206; F16L 37/1225; E21B 17/04; E21B 17/20; E21B 17/046
(Continued)

(56) References Cited

U.S. PATENT DOCUMENTS 5,306,050 A * 4/1994 Laflin ..................... E21B 17/04
6,460,900 B1 * 10/2002 Bakke ................... E21B 17/046
285/330

(Continued)

FOREIGN PATENT DOCUMENTS

CN     2300718 Y    12/1998
CN     2383960 Y    6/2000
(Continued)

OTHER PUBLICATIONS

Aibaibu, Abulimiti et al., "Development and Application of Coiled Tubing Coupling Locator" Oil Field Equipment, vol. 44, No. 11, (2015), pp. 79-81 (Abstract).
(Continued)

*Primary Examiner* — Zachary T Dragicevich
(74) *Attorney, Agent, or Firm* — J.C. Patents

(57) ABSTRACT

A coupling apparatus for coiled tubings of different diameters includes a bottom joint, a top joint, and a back cap, where a gapped slip sleeve is provided on a fitting ring groove on an outer side of an upper portion of the bottom joint, and the gapped slip sleeve is coupled with the bottom
(Continued)

joint via a rotation preventing element capable of preventing radial rotation of the gapped slip sleeve.

6 Claims, 3 Drawing Sheets

(51) Int. Cl.
    *F16L 19/02*     (2006.01)
    *E21B 17/20*     (2006.01)

(58) Field of Classification Search
    USPC ........................................ 285/330; 166/242.6
    See application file for complete search history.

(56) References Cited

U.S. PATENT DOCUMENTS

| | | | |
|---|---|---|---|
| 2007/0062707 A1* | 3/2007 | Leising | ............... E21B 17/04 |
| | | | 166/242.6 |
| 2009/0278348 A1 | 11/2009 | Brotzell et al. | ................ 285/249 |
| 2014/0086681 A1 | 3/2014 | Dobbs | ........................... 403/375 |
| 2016/0281431 A1* | 9/2016 | Peters | |
| 2018/0128058 A1* | 5/2018 | Hatherall | .............. E21B 17/046 |

FOREIGN PATENT DOCUMENTS

| | | |
|---|---|---|
| CN | 201159156 Y | 12/2008 |
| CN | 203948041 U | 11/2014 |
| CN | 206468306 U | 9/2017 |

OTHER PUBLICATIONS

The Chinese First Examination Report of corresponding China patent application No. 201710055271.0, dated Mar. 26, 2018.

\* cited by examiner

COUPLING APPARATUS FOR COILED TUBINGS OF DIFFERENT DIAMETERS, INSTALLING METHOD FOR COUPLING APPARATUS, AND INSTALLING METHOD FOR TUBINGS OF DIFFERENT DIAMETERS USING COUPLING APPARATUS

CROSS-REFERENCE TO RELATED APPLICATION

The present application claims priority to Chinese Patent Application No. 201710055271.0, filed on Jan. 24, 2017, which is hereby incorporated by reference in its entirety.

TECHNICAL FIELD

The present disclosure relates to the technical field of coupling apparatus, and particularly, to a coupling apparatus for coiled tubings of different diameters, an installing method for the coupling apparatus, and an installing method for tubings of different diameters.

BACKGROUND

With the continuous development of technologies for coiled tubings and gradual improvement in their production process and requirements, installation of the coiled tubings encounters many difficulties and limiting factors during installation of tubings of different diameters, such as limitations from, e.g., length of the string, load of the gripper block in the injector head during lifting and lowering operations, high pressure and temperature in the deep well, axial compression load, yield strength of the string, deformation from radial tension, variations in downhole pressure difference, and increased torque on the coiled tubings, etc. Meanwhile, during a deep well operation, there are also situations where the coiled tubings are not long enough to be tripped in the target stratum of the operation, staling progression for the relevant downhole operation. For the purpose of solving the above challenges, two sections of or more coiled tubings of different diameters may be coupled to be tripped in the deep well to carry on the operation. However, due to special conditions associated with the coiled tubings, the coupling location between the coiled tubings of different diameters has to overcome relatively higher tension and torque, the use of common couplers incurs difficulty in installation and poor sealing, or even piercement in some cases.

SUMMARY

The present disclosure provides a coupling apparatus for coiled tubings of different diameters, an installing method for the coupling apparatus, and an installing method for tubings of different diameters, which overcome deficiencies in the prior art and are capable of effectively solving issues, such as low resistance to tension and torque, difficulty in installing, poor sealing property and susceptible to piercement, found in existing coupling apparatuses when coupling coiled tubings of different diameters.

A first technical solution of the present disclosure is implemented through the following: a coupling apparatus for coiled tubings of different diameters, including: a bottom joint, a top joint, and a back cap, where an external limiting boss is retained on an outer side of an upper portion of the bottom joint, a lower portion of the top joint is capped on the outer side of the upper portion of the bottom joint and is seated on the external limiting boss, the back cap is retained on an outer side of the lower portion of the top joint, a first internal limiting boss that is pressed against a lower end of the external limiting boss is retained on an inner side of the back cap beneath the external limiting boss, a fitting ring groove is provided on the outer side of the upper portion of the bottom joint, a gapped slip sleeve having a tapered cone shape is provided outside the fitting ring groove, a longitudinal tensioning gap is provided on a sidewall of the gapped slip sleeve, a second internal limiting boss having a reversely tapered cone shape is retained on the inner side of the top joint at a location corresponding to, and matches, the gapped slip sleeve, teeth of the gapped slip sleeve capable of clamping the second internal limiting boss are distributed on an outer side of the gapped slip sleeve, and the gapped slip sleeve is coupled with the bottom joint via a rotation preventing element capable of preventing radial rotation of the gapped slip sleeve.

The above technical solution may be further optimized and/or improved hereunder

The above described rotation preventing element may be a flat key, at least two U-shaped installing holes that are open at lower ends are circumferentially distributed around a lower portion of the gapped slip sleeve, an installing groove is provided on the outer side of the bottom joint at a location corresponding to each of the U-shaped installing holes respectively, with a flat key being fitted between each paired installing groove and U-shaped installing hole.

There may be four U-shaped installing holes. The longitudinal tensioning gaps and the U-shaped installing holes are circumferentially distributed with even spacing. The four installing grooves are evenly distributed around the outer side of the bottom joint, with each installing groove being internally provided with a flat key that is located within a longitudinal tensioning gap or a U-shaped installing hole to which the installing groove corresponds.

The outer side of the lower portion of the top joint may be threadedly coupled with an inner side of an upper end of the back cap.

The gapped slip sleeve may be a gapped slip sleeve subjected to quenching and tempering.

An upper end face of the above described external limiting boss and a lower end inner face of the top joint may be inclined outwardly and downwardly.

At least two O-shaped sealing rings that are distributed at spacing in a vertical direction may be provided between the outer side of the bottom joint and the inner side of the top joint at a location between the external limiting boss and the fitting ring groove.

A second technical solution of the present disclosure is implemented through the following:

An installing method for the above described coupling apparatus for coiled tubings of different diameters, carried out as the following:

step 1: retaining a top joint with a large diameter coiled tubing; fitting a flat key into each installing groove; after aligning a U-shaped installing hole and a longitudinal tensioning gap at a lower portion of a gapped slip sleeve with the flat key respectively, moving the gapped slip sleeve downward and installing the gapped slip sleeve on an outer side of a bottom joint; capping a back cap on the outer side of the bottom joint from below; and retaining a lower portion of the bottom joint with a small diameter coiled tubing; and step 2: capping the top joint on the outer side of an upper portion of the bottom joint from above; lowering the top joint slowly while rotating the back cap to enable the back cap to be threadedly coupled with the top joint, an inner side of a second internal limiting boss to be pressed tightly against an outer side of a gapped slip sleeve, and an upper end and a lower end of an external limiting boss to be pressed tightly against the lower portion of the top joint and an upper end of a first internal limiting boss, respectively.

A third technical solution of the present disclosure is implemented through the following:

An installing method for coiled tubings of different diameters using the coupling apparatus described above in the first technical solution is implemented through the following:

step 1: pre-configuring a small diameter coiled tubing onto a surface coiled tubing spooling stand; installing a downhole tool at an end of the small diameter coiled tubing; after installing a safety valve at a starting end of the small diameter coiled tubing, pumping working fluid of a predefined pressure into the small diameter coiled tubing;

step 2: installing a well control apparatus at a wellhead to be operated;

step 3: installing within an injector a gripper block matching the small diameter coiled tubing, then inserting the small diameter coiled tubing into the injector;

step 4: retaining the injector at the wellhead, then pressure-testing the wellhead and the well control apparatus;

step 5: after passing the pressure-testing, unfolding the well control apparatus, and passing down-well the small diameter coiled tubing;

step 6: after the small diameter coiled tubing reaches a predefined location, retaining the starting end of the small diameter coiled tubing using a hoisting apparatus, and installing a small diameter coiled tubing pup joint at the starting end;

step 7: lowering the small diameter coiled tubing via the hoisting apparatus and the small diameter coiled tubing pup joint till an upper end thereof is below a lower end of the injector;

step 8: folding the well control apparatus and a tubing hanging apparatus, and detaching the lower end of the injector from the wellhead;

step 9: lifting the injector using the hoisting apparatus, meanwhile passing down the small diameter coiled tubing within the injector till the small diameter coiled tubing pup joint completely leaves the injector;

step 10: after the injector completely leaves the wellhead, detaching the coiled tubing pup joint from the starting end of the small diameter coiled tubing;

step 11: replacing the gripper block within the injector with a gripper block that matches a large diameter coiled tubing, and inserting the large diameter coiled tubing into the injector;

step 12: aligning the injector with the wellhead via the hoisting apparatus; and step 13: retaining a top joint with the large diameter coiled tubing; fitting a flat key into each installing groove; after aligning a U-shaped installing hole and a longitudinal tensioning gap at a lower portion of a gapped slip sleeve with the flat key respectively, moving the gapped slip sleeve downward and fitting the gapped slip sleeve on an outer side of a bottom joint; capping a back cap on the outer side of the bottom joint from below; and retaining the lower portion of the bottom joint with the small diameter coiled tubing;

step 14: capping the top joint on the outer side of an upper portion of the bottom joint from above; lowering the top joint slowly while rotating the back cap to enable the back cap to be threadedly coupled with the top joint, an inner side of a second internal limiting boss to be pressed tightly against an outer side of the gapped slip sleeve, and an upper end and a lower end of an external limiting boss to be pressed tightly against a lower portion of the top joint and an upper end of a first internal limiting boss, respectively; and step 15: installing the injector onto the wellhead, and slowly unfolding the well control apparatus and the tubing hanging apparatus.

The disclosed coupling apparatus for coiled tubings of different diameters is easy to use, and advantageous in terms of, e.g., convenient installation and simple maintenance, providing a solution for coupling coiled tubings of different diameters for the same well during construction work, improving a depth at which the coiled tubing may be inserted, reducing difficulties in fitting coiled tubings of different diameters. When in use, the top joint is retained, at an upper end, with a large diameter coiled tubing, and the bottom joint is retained, at a lower end, with a small diameter coiled tubing. The back cap serves to prevent an axial displacement between the large diameter and small diameter coiled tubings. The gapped slip sleeve and the rotation preventing element may, with their enhanced resistance to tension and torque, effectively prevent the small diameter coiled tubing from axially deflecting relative to the large diameter coiled tubing, adaptability of coiled tubings to deep well operations may be increased, piercement may be avoided at a location where the tubings of different diameters are coupled, and safety may be improved. By using the installing method, coiled tubings of different diameters may be quickly and easily coupled together, facilitating installation of such tubings in deep well operations, ensuring tension and torque resistance, and significantly reducing costs for deep well operations. By using the present installing method for tubings of different diameters, it is possible to consecutively pass-down and couple coiled tubings of different diameters during a deep well operation and ensure reliability and sealability of the entire device, reducing occurrence of piercement at a coupling location, and significantly reducing costs for deep well operations.

Figure 1:
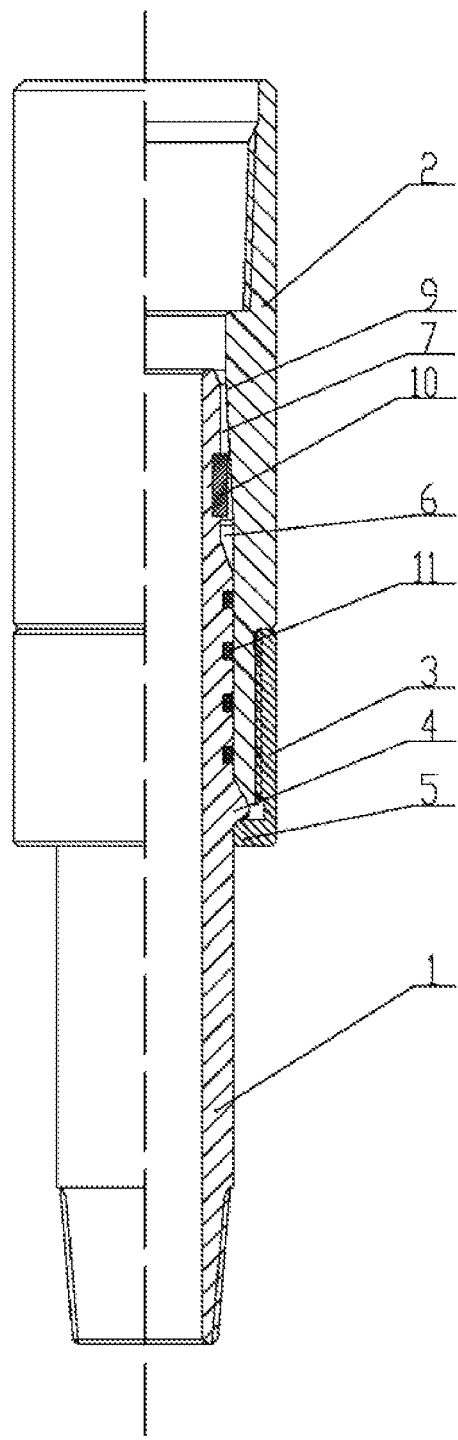
FIG. 1 is a front half-sectional structural view of a preferred embodiment of this disclosure.

Reference numerals in the figures are: 1. the bottom joint; 2. the top joint; 3. the back cap; 4. the external limiting boss; 5. the first internal limiting boss; 6. the fitting ring groove; 7. the gapped slip sleeve; 8. the longitudinal tensioning gap; 9. the second internal limiting boss; 10. the flat key; 11. the O-shaped sealing ring; 12. the teeth of the gapped slip sleeve; and 13. the U-shaped installing hole.

DETAILED DESCRIPTION

This disclosure is by no means limited by any or all of the following embodiments and a specific embodiment may be devised according to disclosed technical solutions and a specific situation.

To facilitate description of the disclosure, spatial relations between various elements are described according to the layout illustrated in FIG. 1. For example, spatial relations such as front, rear, upper, lower, left and right are determined according to the orientation depicted in the accompanying drawings.

The disclosure will be further described hereunder in conjuncture with the embodiments and the drawings.

Embodiment 1

Figure 2:
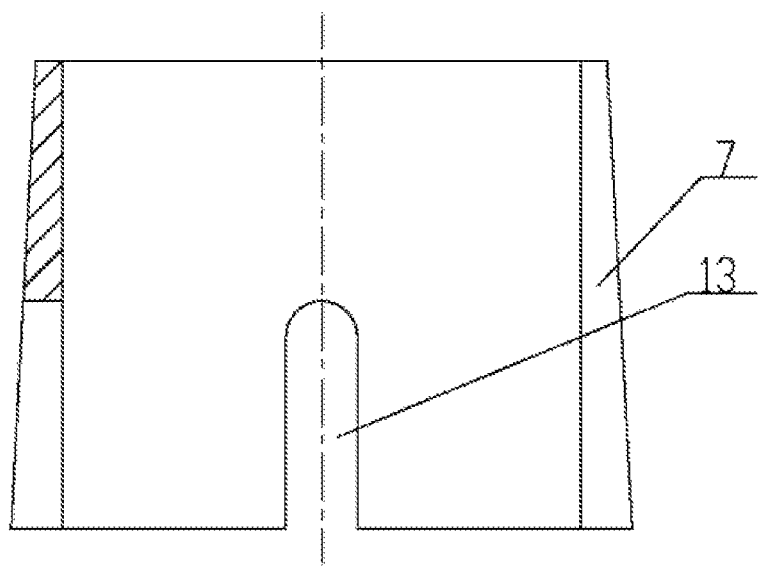
FIG. 2 is an enlarged front sectional structural view of the gapped slip sleeve as shown in FIG. 1.
Figure 3:
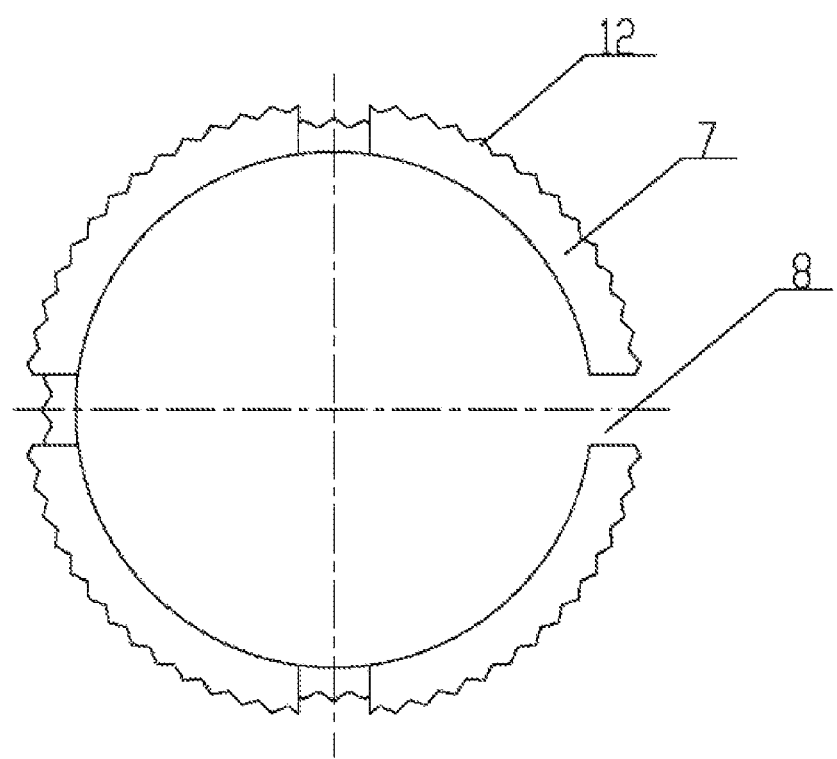
FIG. 3 is a schematic bottom structural view of FIG. 2.

As depicted in FIG. 1, FIG. 2 and FIG. 3, a coupling apparatus for coiled tubings of different diameters includes: a bottom joint 1, a top joint 2, and a back cap 3, where an external limiting boss 4 is retained on an outer side of an upper portion of the bottom joint 1, a lower portion of the top joint 2 is capped on the outer side of the upper portion of the bottom joint 1 and is seated on the external limiting boss 4, the back cap 3 is retained on an outer side of the lower portion of the top joint 2, a first internal limiting boss 5 that is pressed against a lower end of the external limiting boss 4 is retained on an inner side of the back cap 3 beneath the external limiting boss 4, a fitting ring groove 6 is provided on the outer side of the upper portion of the bottom joint 1, a gapped slip sleeve 7 having a tapered cone shape is provided outside the fitting ring groove 6, a longitudinal tensioning gap 8 is provided on a sidewall of the gapped slip sleeve 7, a second internal limiting boss 9 having a reversely tapered cone shape is retained on the inner side of the top joint 2 at a location corresponding to, and matches with, the gapped slip sleeve 7, teeth 12 capable of clamping the second internal limiting boss 9 are distributed on an outer side of the gapped slip sleeve 7, and the gapped slip sleeve 7 is coupled with the bottom joint 1 via a rotation preventing element capable of preventing radial rotation of the gapped slip sleeve 7.

The disclosure is advantageous in terms of, e.g., convenient installation and simple maintenance, providing a solution for coupling coiled tubings of different diameters for the same well during construction work, improving a depth at which the coiled tubing may be inserted, reducing difficulties in fitting coiled tubings of different diameters. When in use, the top joint 2 is retained, at an upper end, with a large diameter coiled tubing, and the bottom joint 1 is retained, at a lower end, with a small diameter coiled tubing. The back cap 3 serves to prevent an axial displacement between the large diameter and small diameter coiled tubings. The gapped slip sleeve 7 and the rotation preventing element may, with their enhanced resistance to tension and torque, effectively prevent the small diameter coiled tubing from axially deflecting relative to the large diameter coiled tubing, adaptability of the coiled tubings to deep well operations may be increased, piercement may be avoided at a location where the tubings of different diameters are coupled, and safety is improved.

Based on actual needs, the embodiment described above may be further optimized and/or improved.

As depicted in FIG. 1, FIG. 2 and FIG. 3, the rotation preventing element is a flat key 10. At least two U-shaped installing holes 13 that are open at lower ends are circumferentially distributed around a lower portion of the gapped slip sleeve 7. An installing groove is provided on the outer side of the bottom joint 1 at a location corresponding to each of the U-shaped installing holes 13 respectively, with a flat key 10 being fitted between each paired installing groove and U-shaped installing hole 13. The flat key 10 is capable of preventing the bottom joint 1 from radially deflecting from the gapped slip sleeve 7, and has features such as simple structure and convenient installation, contributing to cost reduction for the disclosure.

As depicted in FIG. 1, FIG. 2 and FIG. 3, there are three U-shaped installing holes 13, and the longitudinal tensioning gaps 8 and the U-shaped installing holes 13 are circumferentially distributed with even spacing. The four installing grooves are evenly distributed around the outer side of the bottom joint 1, with each installing groove being internally provided with a flat key 10 that is located within a longitudinal tensioning gap 8 or a U-shaped installing hole 13 to which the installing groove corresponds. The flat key 10 cooperates with the teeth 12 to effectively prevent the bottom joint 1 from axially deflecting from the top joint 2, ensuring anti-torque performance for, while facilitating the application of, the disclosure.

As depicted in FIGS. 1, 2 and 3, the outer side of the lower portion of the top joint 2 is threadedly coupled with an inner side of an upper end of the back cap 3. The threaded connection is advantageous in terms of stability, easy dis-/assembly and reliable sealability.

As depicted in FIGS. 1, 2 and 3, the gapped slip sleeve 7 is a gapped slip sleeve 7 subjected to quenching and tempering. Any thermal treatment that involves high-temperature tempering subsequent to quenching may be referred to as quenching and tampering. The gapped slip sleeve 7 subjected to quenching and tempering features low hardness and brittleness, as well as good ductility and contractibility, ensuring toughness for, and increasing the service life of, the disclosure.

As depicted in FIGS. 1, 2 and 3, an upper end face of the external limiting boss 4 and a lower end inner face of the top joint 2 are inclined outwardly and downwardly. The configuration described above make sure a firm abutment between the external limiting boss 4 and the top joint 2, and between the outer side of the gapped slip sleeve 7 and the inner side of the second internal limiting boss 9, enhancing the disclosure in respect of anti-torque and sealing.

As depicted in FIGS. 1, 2 and 3, at least two O-shaped sealing rings 11 that are distributed at spacing in a vertical direction are provided between the outer side of the bottom joint 1 and the inner side of the top joint 2 at a location between the external limiting boss 4 and the fitting ring groove 6. The O-shaped sealing ring 11 is provided to further ensure sealability between the bottom joint 1 and the top joint 2

Embodiment 2

A installing method for the coupling apparatus for coiled tubings of different diameters according to Embodiment 1 as described above, including:

step 1: retaining a top joint 2 with a large diameter coiled tubing; fitting a flat key 10 into each installing groove; after aligning a U-shaped installing hole 13 and a longitudinal tensioning gap 8 at a lower portion of a gapped slip sleeve 7 with the flat key 10 respectively, moving the gapped slip sleeve 7 downward and installing the gapped slip sleeve on an outer side of a bottom joint 1; capping a back cap 3 on the outer side of the bottom joint 1 from below; and retaining a lower portion of the bottom joint 1 with a small diameter coiled tubing;

step 2: capping the top joint 2 on the outer side of an upper portion of the bottom joint 1 from above; lowering the top joint 2 slowly while rotating the back cap 3 to enable the back cap to be threadedly coupled with the top joint 2, an inner side of a second internal limiting boss 9 to be pressed tightly against an outer side of a gapped slip sleeve 7, and an upper end and a lower end of an external limiting boss 4 to be pressed tightly against the lower portion of the top joint 2 and an upper end of a first internal limiting boss 5, respectively;

where the four operations as described in step 1 do not have any particular order, and may be performed simultaneously or in any order, i.e., the operations of "retaining a top joint 2 with a large diameter coiled tubing; fitting a flat key 10 into each installing groove;

after aligning a U-shaped installing hole 13 and a longitudinal tensioning gap 8 at a lower portion of a gapped slip sleeve 7 with the flat key 10 respectively; moving the gapped slip sleeve 7 downward and installing the gapped slip sleeve on an outer side of a bottom joint 1; capping a back cap 3 on the outer side of the bottom joint 1 from below; and retaining a lower portion of the bottom joint 1 with a small diameter coiled tubing".

By using the method, coiled tubings of different diameters may be quickly and easily coupled, facilitating installation of such tubings in deep well operations, ensuring tension and torque resistance, and significantly reducing costs for deep well operations.

Embodiment 3

An installing method for tubings of different diameters using the coupling apparatus described in Embodiment 1, including:

step 1: pre-configuring a small diameter coiled tubing onto a surface coiled tubing spooling stand; installing a downhole tool at an end of the small diameter coiled tubing; after installing a safety valve at a starting end of the small diameter coiled tubing, pumping working fluid of a predefined pressure into the small diameter coiled tubing;

step 2: installing a well control apparatus at a wellhead to be operated;

step 3: installing within an injector a gripper block matching the small diameter coiled tubing, then inserting the small diameter coiled tubing into the injector;

step 4: retaining the injector at the wellhead, then pressure-testing the wellhead and the well control apparatus;

step 5: after passing the pressure-testing, unfolding the well control apparatus and passing down-well the small diameter coiled tubing;

step 6: after the small diameter coiled tubing reaches a predefined location, retaining the starting end of the small diameter coiled tubing using a hoisting apparatus, and installing a small diameter coiled tubing pup joint at the starting end;

step 7: lowering the small diameter coiled tubing via the hoisting apparatus and the small diameter coiled tubing pup joint till an upper end thereof is below a lower end of the injector;

step 8: folding the well control apparatus and a tubing hanging apparatus, and detaching the lower end of the injector from the wellhead;

step 9: lifting the injector using the hoisting apparatus, meanwhile passing down the small diameter coiled tubing within the injector till the small diameter coiled tubing pup joint completely leaves the injector;

step 10: after the injector completely leaves the wellhead, detaching the coiled tubing pup joint from the starting end of the small diameter coiled tubing;

step 11: replacing the gripper block within the injector with a gripper block that matches a large diameter coiled tubing, and inserting the large diameter coiled tubing into the injector;

step 12: aligning the injector with the wellhead via the hoisting apparatus; and step 13: retaining a top joint 2 with the large diameter coiled tubing; fitting a flat key 10 into each installing groove; after aligning a U-shaped installing hole 13 and a longitudinal tensioning gap 8 at a lower portion of a gapped slip sleeve 7 with the flat key 10 respectively; moving the gapped slip sleeve 7 downward and fitting the gapped slip sleeve on an outer side of a bottom joint 1; capping a back cap 3 on the outer side of the bottom joint 1 from below; and retaining the lower portion of the bottom joint 1 with the small diameter coiled tubing.

step 14: capping the top joint 2 on the outer side of an upper portion of the bottom joint 1 from above; lowering the top joint 2 slowly while rotating the back cap 3 to enable the back cap to be threadedly coupled with the top joint 2, an inner side of a second internal limiting boss 9 to be pressed tightly against an outer side of the gapped slip sleeve 7, and an upper end and a lower end of an external limiting boss 4 to be pressed tightly against a lower portion of the top joint 2 and an upper end of a first internal limiting boss 5, respectively; and step 15: installing the injector onto the wellhead, and slowly unfolding the well control apparatus and the tubing hanging apparatus, where the four operations as described in step 13 do not have any particular order, and may be performed simultaneously or in any order, i.e., the operations of retaining a top joint 2 with the large diameter coiled tubing; fitting a flat key 10 into each installing groove; after aligning a U-shaped installing hole 13 and a longitudinal tensioning gap 8 at a lower portion of a gapped slip sleeve 7 with the flat key 10 respectively; moving the gapped slip sleeve 7 downward and fitting the gapped slip sleeve on an outer side of a bottom joint 1; capping a back cap 3 on the outer side of the bottom joint 1 from below; and retaining the lower portion of the bottom joint 1 with the small diameter coiled tubing".

After the above steps are completed, the large diameter and small diameter coiled tubings are completely installed in the deep well operation, and the procedure may move on to other downhole operations such as injecting high pressure fluid for sand washing, tube-washover, etc. The equipments and tools employed in the above described method, i.e., the surface coiled tubing spooling stand, the downhole tool, the safety valve, the hoisting apparatus, the tubing hanging apparatus, the injector, etc., are existing technologies well know in the art. By using the present method, it is possible to consecutively pass-down and couple coiled tubings of different diameters during a deep well operation and ensure reliability and sealability of the entire device, reducing occurrence of piercement at a coupling location, and significantly reducing costs for deep well production operations.

The above technical features, which constitute the embodiments of the present disclosure, are highly adaptable and can provide better implementation outcomes, and non-essential technical features may be added thereto, or removed therefrom, according to particular requirements in order to fulfill the need of various situations.

What is claimed is:

1. A coupling apparatus for coiled tubings of different diameters, comprising:
    a bottom joint,
    a top joint, and
    a back cap,
    wherein an external limiting boss is retained on an outer side of an upper portion of the bottom joint, a lower portion of the top joint is capped on the outer side of the upper portion of the bottom joint and is seated on the external limiting boss, the back cap is retained on an outer side of the lower portion of the top joint, a first internal limiting boss that is pressed against a lower end of the external limiting boss is retained on an inner side of the back cap beneath the external limiting boss, a fitting ring groove is provided on the outer side of the upper portion of the bottom joint, a gapped slip sleeve having a tapered cone shape is provided outside the fitting ring groove, a longitudinal tensioning gap is provided on a sidewall of the gapped slip sleeve, a second internal limiting boss having a reversely tapered cone shape is retained on an inner side of the top joint at a location corresponding to, and matches, the gapped slip sleeve, teeth of the gapped slip sleeve capable of clamping the second internal limiting boss are distributed on an outer side of the gapped slip sleeve, and the gapped slip sleeve is coupled with the bottom joint via a rotation preventing element capable of preventing radial rotation of the gapped slip sleeve, wherein the rotation preventing element is a flat key, at least two U-shaped installing holes that are open at lower ends are circumferentially distributed around a lower portion of the gapped slip sleeve, an installing groove is provided on an outer side of the bottom joint at a location corresponding to each of the U-shaped installing holes respectively, with a flat key being fitted between each paired installing groove and U-shaped installing hole.

2. The coupling apparatus according to claim 1, wherein the outer side of the lower portion of the top joint is threadedly coupled with an inner side of an upper end of the back cap.

3. The coupling apparatus according to claim 1, wherein the gapped slip sleeve is a gapped slip sleeve subjected to quenching and tempering; and/or an upper end face of the external limiting boss and a lower end inner face of the top joint are inclined outwardly and downwardly; and/or at least two O-shaped sealing rings that are distributed at spacing in a vertical direction are provided between the outer side of the bottom joint and the inner side of the top joint at a location between the external limiting boss and the fitting ring groove.

4. The coupling apparatus according to claim 2, wherein the gapped slip sleeve is a gapped slip sleeve subjected to quenching and tempering; and/or an upper end face of the external limiting boss and a lower end inner face of the top joint are inclined outwardly and downwardly; and/or at least two O-shaped sealing rings that are distributed at spacing in a vertical direction are provided between the outer side of the bottom joint and the inner side of the top joint at a location between the external limiting boss and the fitting ring groove.

5. An installing method for the coupling apparatus according to claim 2, comprising:

step 1: retaining the top joint with a large diameter coiled tubing; fitting the flat key into each installing groove; after aligning the U-shaped installing hole and the longitudinal tensioning gap at the lower portion of the gapped slip sleeve with the flat key respectively, moving the gapped slip sleeve downward and installing the gapped slip sleeve on the outer side of the bottom joint; capping the back cap on the outer side of the bottom joint from below; and retaining a lower portion of the bottom joint with a small diameter coiled tubing; and step 2: capping the top joint on the outer side of the upper portion of the bottom joint from above; lowering the top joint slowly while rotating the back cap to enable the back cap to be threadedly coupled with the top joint, an inner side of the second internal limiting boss to be pressed tightly against the outer side of the gapped slip sleeve, and an upper end and a lower end of the external limiting boss to be pressed tightly against the lower portion of the top joint and an upper end of the first internal limiting boss, respectively.

6. An installing method for tubings of different diameters using the coupling apparatus according to claim 2, comprising:

step 1: pre-configuring a small diameter coiled tubing onto a surface coiled tubing spooling stand; installing a downhole tool at an end of the small diameter coiled tubing; after installing a safety valve at a starting end of the small diameter coiled tubing, pumping working fluid of a predefined pressure into the small diameter coiled tubing;

step 2: installing a well control apparatus at a wellhead to be operated;

step 3: installing within an injector a gripper block matching the small diameter coiled tubing, then inserting the small diameter coiled tubing into the injector;

step 4: retaining the injector at the wellhead, then pressure-testing the wellhead and the well control apparatus;

step 5: after passing the pressure-testing, unfolding the well control apparatus and passing down-well the small diameter coiled tubing;

step 6: after the small diameter coiled tubing reaches a predefined location, retaining the starting end of the small diameter coiled tubing using a hoisting apparatus, and installing a small diameter coiled tubing pup joint at the starting end;

step 7: lowering the small diameter coiled tubing via the hoisting apparatus and the small diameter coiled tubing pup joint till an upper end thereof is below a lower end of the injector;

step 8: folding the well control apparatus and a tubing hanging apparatus, and detaching the lower end of the injector from the wellhead;

step 9: lifting the injector using the hoisting apparatus, meanwhile passing down the small diameter coiled tubing within the injector till the small diameter coiled tubing pup joint completely leaves the injector;

step 10: after the injector completely leaves the wellhead, detaching the coiled tubing pup joint from the starting end of the small diameter coiled tubing;

step 11: replacing the gripper block within the injector with a gripper block that matches a large diameter coiled tubing, and inserting the large diameter coiled tubing into the injector;

step 12: aligning the injector with the wellhead via the hoisting apparatus; and step 13: retaining the top joint with the large diameter coiled tubing; fitting the flat key into each installing groove; after aligning the U-shaped installing hole and the longitudinal tensioning gap at the lower portion of the gapped slip sleeve with the flat key respectively, moving the gapped slip sleeve downward and fitting the gapped slip sleeve on the outer side of the bottom joint; capping the back cap on the outer side of the bottom joint from below; and retaining a lower portion of the bottom joint with the small diameter coiled tubing;

step 14: capping the top joint on the outer side of the upper portion of the bottom joint from above; lowering the top joint slowly while rotating the back cap to enable the back cap to be threadedly coupled with the top joint, an inner side of the second internal limiting boss to be pressed tightly against the outer side of the gapped slip sleeve, and an upper end and a lower end of the external limiting boss to be pressed tightly against the lower portion of the top joint and an upper end of the first internal limiting boss, respectively; and step 15: installing the injector onto the wellhead, and slowly unfolding the well control apparatus and the tubing hanging apparatus.

* * * * *